Patented July 28, 1936

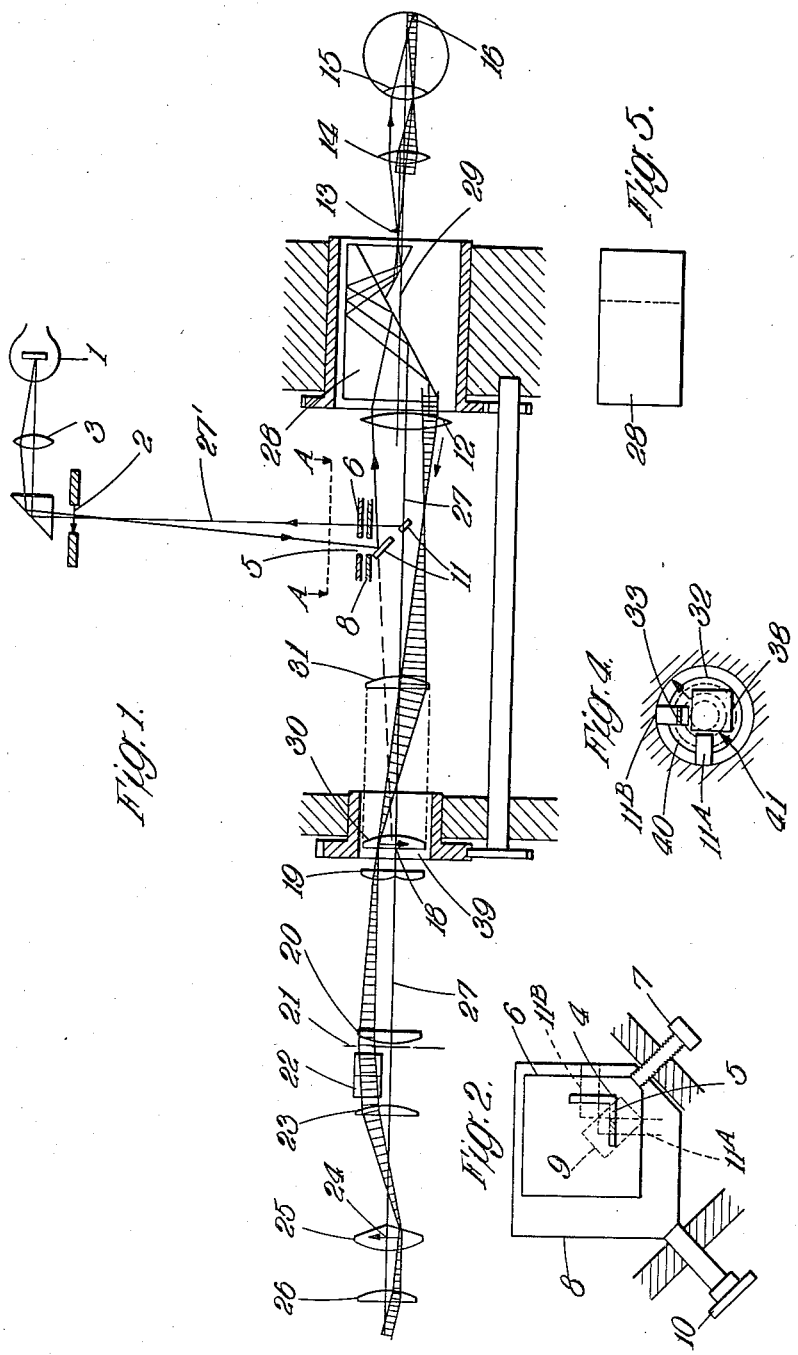

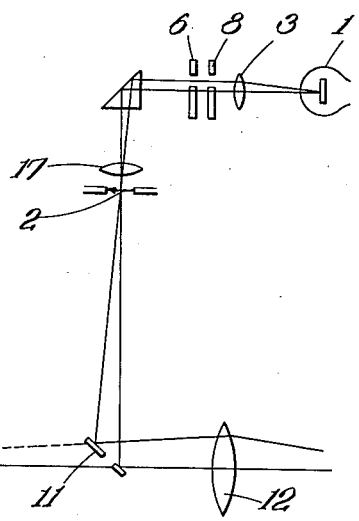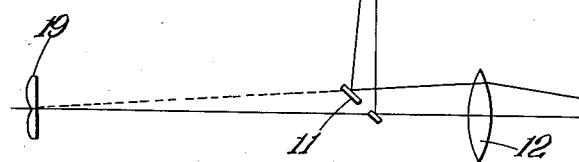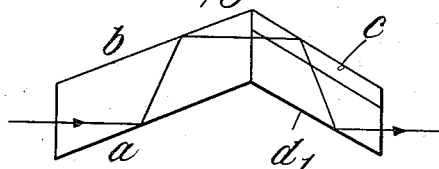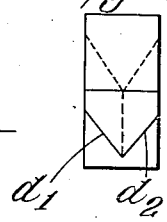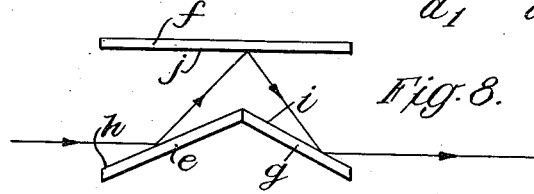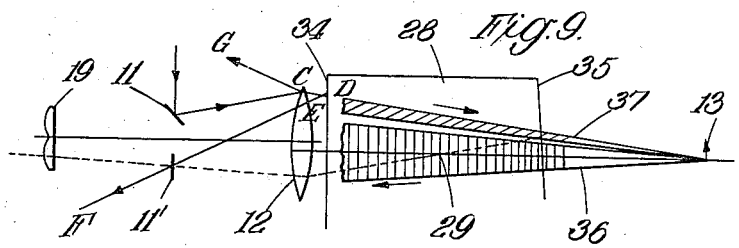

2,049,222

UNITED STATES PATENT OFFICE 2,049,222

SIGHT-TESTING APPARATUS

Richard Edmund Reason, Leicester, England, assignor to Kapella Limited, Leicester, England Application June 12, 1935, Serial No. 26,124
In Great Britain June 23, 1934

7 Claims. (Cl. 88—20)

The present invention relates to sight-testing apparatus of the kind comprising a projecting system for forming upon the retina of a subject's eye an image of a target, and an observing system for viewing the retina and the image formed thereon, and particularly to apparatus of this kind adapted to measure the refraction of the eye, wherein for example, the axes of the projecting and observing systems are separate at the pupil and intersect, by adjustment, at the retina.

Apparatus of this kind is described in the specifications of British Letters Patent Nos. 413,029, 430,761, 430,836, and 432,727, filed January 24, 1933, January 18, 1934, January 29, 1934, and February 3, 1934, respectively.

In order to determine the refraction in various orientations, or in order to determine the axis of astigmatism of the eye, the apparatus has been made rotatable about the axis of the eye and it has also been proposed to obtain an equivalent effect by inserting a Dove reversing prism in the apparatus and rotating this prism instead of the whole apparatus. Furthermore in order to measure the refraction accurately the axis of the apparatus must be aligned with respect to the centre of the pupil and for this purpose the apparatus has been made adjustable about two perpendicular "lateral" axes both of which are perpendicular to the axis of rotation of the apparatus.

Such a prismatic arrangement suffers from several disadvantages however. In the first place since a Dove prism comprises one reflecting and two refracting surfaces and the light enters and leaves the prism at substantial angles to the entrant and emergent refracting faces, aberrations are introduced at these faces. Secondly, in apparatus comprising means for observing the subject's pupil to facilitate alignment, the image of the pupil, when the observing system is adjusted about one of the lateral axes, appears to move along an axis inclined to the lateral axis unless the plane of reversal happens to be parallel to the lateral axis; in general, therefore, it is difficult for an observer to decide in which lateral direction the instrument should be displaced in order to secure alignment and this difficulty is increased in the case of apparatus for determining refraction in which one part of the image viewed is reversed with respect to another part.

Lastly ghost reflections from various elements of the apparatus have been found very troublesome and somewhat difficult to remove.

It is an object of the present invention to provide a practicable instrument substantially free from the disadvantages outlined above.

According to the present invention sight-testing apparatus comprises a projecting system for forming on the retina of a subject's eye an image of a target and an observing system for viewing the retina and the image formed thereon, wherein there is provided a rotatable reversing member which is common to the projecting and observing systems and which has three or five surfaces at which light is reflected, the elements of the observing and projecting systems on the target side of said rotatable reversing member being disposed on an axis which is parallel to but offset with respect to an axis upon which the member and the elements on the eye side of the member are disposed. The reversing member preferably has the form of an internally reflecting prism, although separated externally reflecting surfaces may also be used.

The invention will now be described with reference to the accompanying diagrammatic drawings, in which Figure 1 shows the optical elements of one form of sight-testing apparatus arranged in accordance with the present invention, Figure 2 is a view, taken on the line AA of Figure 1, of a mask shown in Figure 1. Figure 3 shows an alternative arrangement of the elements 1 to 8 inclusive of Figure 1, Figure 4 illustrates the field of view seen in the instrument of Figure 1, Figure 5 is a plan view of a reversing prism shown in Figure 1, Figures 6 and 7 are front and side elevations respectively of a reversing prism which may be used in place of the reversing prism 28 shown in Figures 1 and 5, Figure 8 is a view of a purely reflecting device which may be used in place of the reversing prism 28 of Figure 1, and Figure 9 is a view illustrating the formation of ghost reflections at the surfaces of a lens and reversing prism shown in Figure 1.

Referring now to Figure 1, light from a source 1 is condensed upon a target 2 in the form of a slit, by means of a lens 3. Light diverging from each point in the target 2 passes through one of two slots 4 and 5 (see Figure 2) disposed at right angles in a plate 6 which may be moved, in a direction bisecting the angle between the slots, by means of a screw 7. Beneath the plate 6 is a second plate 8 having an aperture 9. The plate 8 may be moved by a handle 10, so as to uncover either of the slots 4 and 5. Light passing through the slot 5 is deviated at a reflector 11 (Figure 1) and is focused, by lens 12, to an image 13, and a further image of 13 is formed by lens 14 and eye-lens 15 at 16 upon the retina of the subject's eye. The reflector 11 comprises two perpendicularly disposed radial arms 11A and 11B (see Figure 2)

arranged so that by adjustment of the plate 8 light can be reflected at one or other of the arms and thence through either of two eccentric areas 90° away from each other on the subject's pupil.

By moving the plate 6 in its own plane along the bisector of the slots 4 and 5 the radial position of whichever patch of light is on the eye-lens 15 may be varied. The plates 6 and 8 and the reflector 11 thus together form a relimiting device with which may be selected and limited the area on the subject's pupil through which light passes towards the retina. If desired the plates 6 and 8 may be disposed, as shown in Figure 3, between the target 2 and the source 1 and an image of the plates formed substantially at the reflector 11 by means of a lens 17. This arrangement may be found preferable since the members of the delimiting device and the reflector 11 may then in effect be superimposed at the image of the pupil.

The lenses 12 and 14 are arranged with their focal planes at the reflector 11 and the eye-lens 15 respectively so that the light imaging the pupil is parallel between them and an image of the eye-lens 15 is formed coincident with the reflector 11.

The lenses 15 and 14 together form an image of the retina at 13 and, in the absence of lenses 30 and 31, the functions of which will be explained later, lens 12 forms an image of 13 at 18. The light rays forming the image 18 are divided, partially reversed and observed (in the manner described in the above-mentioned co-pending applications) with the aid of the components 19 to 26 inclusive, 22 being a reversing prism in one of the divided beams and 25 and 26 being a microscope eye-piece.

Thus images of the retina are formed at 13 and 18 and a partially reversed image at 24, this last image being viewed in the eye-piece 25, 26. In order to focus an image of the target 2 accurately on the retina the whole of the system to the left of the lens 14 is mounted for movement along an axis 27 so that the image 13 of the target 2 may be moved towards or away from the lens 14, the projecting system being in no way disturbed by this movement since parallel light passes between the lenses 12 and 14. The refraction of the eye is determined by measuring the distance through which the image 13 of the target has to be moved in order to focus it on the retina. Measurements in various orientations are achieved by rotating a reversing prism 28 about an axis 29 which is parallel to but offset with respect to axis 27 and which passes through the centre of the eye-lens 15, rotation of this prism having the same effect as if the subject's eye were rotated about its centre, whilst the whole optical apparatus were kept fixed.

The axis of the reversing member, whether it be the prism 28 or some other system of reflectors, is taken to be that line the reflected image of which emerges without a shift or change of direction.

In order to observe the subject's pupil and align the observing system with respect thereto an auxiliary pupil-sighting lens 31 and a field lens 30 are swung into the observing system as described in British Patent 430,836, filed January 29, 1934, these lens being adapted to form an image of the reflector 11 and hence of the pupil at the positions 18 and 24, this composite image being viewed in the eye piece 25, 26. The horizontal arm of the reflector 11 is roof-shaped on its upper sides, one face of the arm being polished to reflect light from the target 2 forwards towards the subject's eye, and the other face serving to scatter or reflect part of the light passing through the slot 5 backwards towards the eye-piece 25, 26. On looking through the eye-piece with the lenses 30 and 31 in position, the observer therefore sees an image 32 (Figure 4) of the pupil of the eye as a dull red disc illuminated by light scattered back from the retina, the arms 11A and 11B of the reflector 11 with which it has to be centered, apparently superimposed in it, and a small bright patch 33 of light on the upper side of one arm which indicates the exact position on the pupil at which the target beam is passing through it; this position can be varied as already described by adjustment of the plate 6.

A plan view of the prism 28 is shown in Figure 5, and it will be seen that the prism comprises an odd number of reflecting faces (in this case three) and two refracting faces which are disposed approximately normally to the axis of the prism. Thus little or no abberation arises at the two refracting faces of the prism.

Another form of prism which may be used in place of the prism 28 is shown in Figs. 6 and 7. It comprises two refracting and five reflecting surfaces. Light enters the prism normally in the direction of the arrow, is reflected in turn at the plane surfaces $a$, $b$, $c$, suffers two reflections at the V surfaces $d_1$ and $d_2$ and then emerges from the prism normally. This form of prism has the advantage that none of the surfaces need be metallized but is more expensive to make than the prism 28. Alternatively a device of the kind shown in Figure 8, and comprising three plane mirrors $e$, $f$, $g$, having reflecting surfaces $h$, $j$, $i$, respectively, may be used in place of the prism 28 of Fig. 1.

Referring again to Figure 1 great difficulty has been experienced in eliminating ghost reflections from the elements 12, 28, and 14; it is necessary to eliminate first order ghosts completely; second order ghosts do not arise, but even third order ghosts must be thrown well out of focus.

Since the illuminated area of the pupil is delimited at a place where the light is diverging from each point in the target ghost reflections off the lens 12 are readily thrown outside the field of the instrument, the first ghost for example proceeding along the path CG, as shown in Figure 9.

First order reflections of the faces of the prism 28 are returned through the lens 12 and focussed by auto-collimation in the plane of the reflector 11 so that they could, if desired, be eliminated by placing in the plane of 11 an opaque mask 11' which is the mirror image of 11. Alternatively such a mask could be placed at any image of the reflector 11 lying to the left of the reflector itself. This method is somewhat critical however, because small departures from normality to the axis of the faces of the prism 28 throw the ghosts off such a mask. It may, therefore, be found preferable to arrange the lens 12 close to the first face 34 of the prism (as shown in Figure 9) in which case the reflections from this face, which pass through 11, the mirror image of 11 are thrown to one side of the field at 19 along the path DEF for example, and are not seen in the eye-piece of the instrument.

This arrangement does not, however, dispose of the ghost reflection at the rear face 35 of the prism 28, which, if the face were normal to the axis, would proceed along the dotted path and enter 18. Now if the image 13 be formed actually at the rear face 35 the latter can be tilted considerably without introducing aberrations affecting the retinal image, so that the ghost reflection can easily be thrown to one side of the field, but in this case scattered light due to dust on the rear face 35 then becomes very apparent and may seriously diminish the efficiency and accuracy of the instrument. It is found, however, that if the rear face 35 be moved away from the image 13 a position is reached at which the scattered light is insufficient to spoil the observations but at which the face is still sufficiently close to the image to permit the face to be tilted sufficiently to avoid the ghost without introducing appreciable aberrations. Ultimately a position is reached where the beams 36 and 37 entering and emerging from the prism respectively are just completely separated, so that none of the light scattered from the face 35 can enter the observing system.

As shown in this figure, therefore, the front face 34 is disposed normally to its axis 29 and close to the lens 12, whilst the rear face 35 is inclined to the axis sufficiently to throw ghost reflections to one side and is at a distance from the image 13 sufficient to avoid the introduction of errors due both to scattered light and to aberrations at the surface 35. The necessity for an opaque mask at the reflector 11 (or at an image thereof) is thus avoided, with the result that practically the whole of the field of view (see Figure 4) between 12 o'clock and 9 o'clock is unobscured. Consequently the radial distance between the centres of the area of the entering and emerging beams at the subject's pupil, and also the size of the emerging area may be increased, giving a concurrent increase in sensitivity and brightness. Referring to Figure 4 this radial distance is that between the centres of the areas 33 and 38.

Finally it is found that in order to avoid ghosts off the lens 14 the image 13 must be formed substantially only on one side of the axis 29. At the same time it is found difficult to place a target of satisfactory length so that its image in the reflector 11 lies wholly on one side of the axis 27 of lens 12, because the lens 12 can be readily freed of ghosts only by mounting the target so that its image in the reflector 11 lies symmetrically about the axis 27, or extends towards the same side as the image 13. Furthermore the image of the reflector 11 must be rotated by the prism 28 concentrically round the pupil of the eye the axis of which is coincident with that of the lens 14, that is, the image of the point of intersection of the axes 27 and 27' must be centred on the pupil.

These conditions are simultaneously satisfied by mounting the lens 14 and prism 28 on the axis 29 of the eye and the elements to the left of the prism 28 upon the axis 27 which is parallel to axis 29 but sufficiently offset therefrom to ensure that the image 13 of the target lies sufficiently to one side of the axis 29.

Thus the image 13 is suitably displaced and, in addition, because of the reflector 11 and pupil 15 are at the principal focal planes of the lenses 12 and 14 respectively, the image at the pupil of said point of intersection remains accurately centred thereon. The axis of the prism 28 and the axis 29 are coaxial so that the illuminating beam rotates concentrically around the lens 14 and the pupil.

It will be noticed that since both the observing and target beams pass through the prism 28, mechanical errors in the location of the prism affect both beams equally and do not introduce errors into the measurements. Furthermore, the target 2, reflector 11 and prism 28, the relative position of which determines the accuracy of the readings, are moved bodily together for making measurements, so that again errors in the motion affect both beams equally and do not introduce errors into the readings.

In cases where provision is made for sighting on the pupil, for example as described in British Patent 430,836, filed January 29, 1934, the difficulty, which has been mentioned earlier, of perceiving in which direction and about which of the lateral axes of adjustment the observing system must be moved in order to secure alignment with the pupil is eleminated by providing a radial line, arrow or similar pointer upon a plate 39 (Figure 1) rotatably mounted in the observing system at an image of the pupil. The plate 39 is coupled by suitable gearing to the reversing prism 28 and arranged to rotate in the same direction as, but at twice the speed of, the prism. The pointer may have a second radial line preferably of different appearance arranged at right angles thereto and may be illuminated by a suitably disposed lamp or may be self-luminous. With this arrangement whatever the angular position of the prism 28, the two lines of the pointer will indicate respectively the direction in which the observed image of the reflector 11 will move when the instrument is adjusted about each of the lateral axes.

The plate 39 may also be inscribed with circles to facilitate the centering operation. These circles and a pointer in the form of a single arrow are seen in the eye piece somewhat as shown in Figure 4, 40 being the concentric circles and 41 the arrow.

I claim:—

1. Sight-testing apparatus including a target, a projecting system of optical elements for forming an image of the target upon the retina of a subject's eye, an observing system of optical elements for viewing the retina and the image formed thereon, and a rotatable reversing member which is common to the projecting and observing systems and which has an odd number not less than three and not greater than five of reflective faces, elements of the observing and projecting systems on the target side of said rotatable reversing member being disposed upon an axis which is parallel to but offset with respect to an axis upon which the member and elements on the eye side of the member are disposed.

2. Sight-testing apparatus including a target, a projecting system of optical elements for forming an image of the target upon the retina of a subject's eye, an observing system of optical elements for viewing the retina and the pupil of the subject's eye, a delimiting device, for selecting the area of the pupil through which light enters the eye, disposed substantially at an image of the pupil in light diverging from each point in the target, and a rotatable reversing member which is common to the projecting and observing systems and which has an odd number not less than three and not greater than five of reflective faces, elements of the observing and projecting systems on the target side of said rotatable reversing member being disposed upon an axis which is parallel to but offset with respect to an axis upon which the member and elements on the eye side of the member are disposed.

3. Sight-testing apparatus including a target, a projecting system of optical elements for forming an image of the target upon the retina of a subject's eye, an observing system of optical elements for viewing the retina and the pupil of the subject's eye, a delimiting device, for selecting the area of the pupil through which light enters the eye, disposed so that an image thereof is substantially at an image of the pupil in light diverging from each point in the target, and a rotatable reversing member which is common to the projecting and observing systems and which has an odd number not less than three and not greater than five of reflective faces, elements of the observing and projecting systems on the target side of said rotatable reversing member being disposed upon an axis which is parallel to but offset with respect to an axis upon which the member and elements on the eye side of the member are disposed.

4. Sight-testing apparatus including a target, a projecting system for forming an image of the target upon the retina of a subject's eye, an observing system for viewing the retina and the pupil of the subject's eye, a rotatable reversing member, common to said projecting and observing systems, having an odd number not less than three and not greater than five of reflective faces, and interlocked with said reversing member a rotatable pointer disposed substantially at an image of the pupil.

5. Sight-testing apparatus including a target, a projecting system for forming an image of the target on the retina of a subject's eye, an observing system for forming an image of the retina, and a rotatable reversing member common to the two systems having one of its refractive faces disposed near said image of the retina and inclined at a small angle to the axis of the member, its other refractive face disposed substantially normal to the axis of the member, and having an odd number not less than three and not greater than five of reflective faces.

6. Sight-testing apparatus including a target, a projecting system for forming an image of the target upon the retina of a subject's eye, an observing system for viewing the retina and the pupil of the subject's eye, a delimiting device, for selecting the area of the pupil through which light enters the eye, disposed substantially at an image of the pupil in light diverging from the target, an opaque mask, which is the mirror image of said delimiting device, disposed substantially at an image of the pupil, and a rotatable reversing member, common to the two systems having its refractive faces disposed substantially normal to its axis and having an odd number not less than three and not greater than five of reflective faces.

7. Sight-testing apparatus including a target, a projecting system of optical elements for forming an image of the target upon the retina of a subject's eye, an observing system of optical elements for forming an image of the retina, and a rotatable reversing prism, common to the two systems, having one of its refractive faces disposed near said image of the retina and inclined at a small angle to the axis of the prism, its other refractive face disposed substantially normal to the axis of the prism, and having an odd number not less than three and not greater than five of reflective faces, elements of the observing and projecting systems on the target side of said rotatable reversing prism being disposed upon an axis which is parallel to, but offset with respect to an axis upon which the prism and elements on the eye side of the prism are disposed.

RICHARD EDMUND REASON.

Certificate of Correction

Patent No. 2,049,222. July 28, 1936.

RICHARD EDMUND REASON

It is hereby certified that errors appear in the printed specification of the above numbered patent requiring correction as follows: Page 2, first column, line 9, for "relimiting" read *delimiting*; line 70, for "lens" read *lenses*, and second column, line 22, for "abberation" read *aberration*; line 51, strike out "Fig." and insert instead the syllable *ure*; line 52, for "of" first occurrence, read *off*; line 67, for "11" first occurrence, read *11'*; page 3, second column, line 17, for "eleminated" read *eliminated*; and that the said Letters Patent should be read with these corrections therein that the same may conform to the record of the case in the Patent Office.

Signed and sealed this 6th day of October, A. D. 1936.

[SEAL]

HENRY VAN ARSDALE,
*Acting Commissioner of Patents.*